United States Patent
Morris

(10) Patent No.: US 10,954,373 B2
(45) Date of Patent: *Mar. 23, 2021

(54) WATER-SOLUBLE POLYMER AND POLYMER INTERNAL LUBRICANT

(71) Applicant: PETER MORRIS RESEARCH AND DEVELOPMENT LIMITED, Tetbury (GB)

(72) Inventor: Peter Morris, Cirencester (GB)

(73) Assignee: PETER MORRIS RESEARCH AND DEVELOPMENT LIMITED, Tetbury (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/417,680

(22) Filed: May 21, 2019

(65) Prior Publication Data

US 2019/0270875 A1 Sep. 5, 2019

Related U.S. Application Data

(62) Division of application No. 14/779,979, filed as application No. PCT/GB2014/050846 on Mar. 18, 2014, now Pat. No. 10,358,549.

(51) Int. Cl.
*C08L 29/04* (2006.01)
*C08K 5/00* (2006.01)
*C08K 5/098* (2006.01)
*C08F 16/06* (2006.01)

(52) U.S. Cl.
CPC .............. *C08L 29/04* (2013.01); *C08F 16/06* (2013.01); *C08K 5/0016* (2013.01); *C08K 5/098* (2013.01); *C08F 2500/12* (2013.01)

(58) Field of Classification Search
CPC ................. C08L 29/04; C08K 5/098
See application file for complete search history.

(56) References Cited

U.S. PATENT DOCUMENTS

| | | | | | |
|---|---|---|---|---|---|
| 3,882,196 A | * | 5/1975 | Hanke | ...................... | C08F 8/50 524/414 |
| 5,317,052 A | * | 5/1994 | Ohba | ...................... | B32B 27/30 524/413 |
| 2002/0068806 A1 | * | 6/2002 | Yoshimi | .................. | B32B 27/32 526/330 |
| 2004/0168904 A1 | * | 9/2004 | Anazawa | ............... | B01J 19/087 204/164 |
| 2006/0173092 A1 | * | 8/2006 | Stevens | .................. | C08K 5/053 523/124 |
| 2009/0011356 A1 | * | 1/2009 | Tomita | ................... | C08G 63/85 430/109.4 |
| 2013/0267647 A1 | * | 10/2013 | Tsujimoto | ............. | C08F 116/06 524/543 |
| 2015/0060699 A1 | * | 3/2015 | Janoff | .................... | G01N 21/64 250/459.1 |

FOREIGN PATENT DOCUMENTS

JP 2008239777 A * 10/2008

OTHER PUBLICATIONS

Glycerine: an overview; The Soap and detergent Association (Year: 1990).*

* cited by examiner

*Primary Examiner* — Mark S Kaucher
(74) *Attorney, Agent, or Firm* — A.C. Entis-IP Ltd.; Allan C. Entis; Kenichi N. Hartman

(57) ABSTRACT

A method of making a water soluble polymer composition comprising blending a water soluble polymer with at least 15% by weight of the total weight of the composition of a hygroscopic salt to act as a lubricant to render the polymer extrudable and/or mouldable, wherein the water content of the composition is of less than 10% by weight of the total weight of the composition.

17 Claims, No Drawings

WATER-SOLUBLE POLYMER AND POLYMER INTERNAL LUBRICANT

RELATED APPLICATIONS

The present application is a Divisional Application of currently pending U.S. Ser. No. 14/779,979 filed Sep. 25, 2015, which is a U.S. National Phase of PCT Application No. PCT/GB2014/050846, filed on Mar. 18, 2014, which claims the benefit under 35 U.S.C. § 119(a)-(d) of British Application GB 1305380.6 filed on Mar. 25, 2013, the disclosures of which are incorporated herein by reference.

FIELD OF THE INVENTION

The present invention relates to a polymer internal lubricant, particularly but not exclusively to polyvinyl alcohol polymers, and to methods for their production.

BACKGROUND OF THE INVENTION

There is currently an increasing demand for water soluble, biodegradable polymers to replace the substantial amount of non-biodegradable polymers that are in the marketplace. Non-biodegradable polymers place a significant demand on resource due to the requirement for their disposal in landfill sites or by incineration.

Poly vinyl alcohol (PVA) is recognized as one of the very few vinyl polymers soluble in water that is also susceptible of ultimate biodegradation in the presence of suitably acclimated microorganisms. Accordingly, increasing attention is being devoted to the preparation of environmentally compatible PVA-based materials for a wide range of applications. PVA has excellent film and thin-walled container forming properties, demonstrating a high degree of impermeability to a number of gases, making it highly suitable for use in packaging products for release in an aqueous environment. It also has high adhesive strength, and is nontoxic. However, these properties are dependent on humidity due to the polymer absorbing water which reduces its tensile strength but increases its elongation and tear strength. It is also difficult to successfully extrude PVA or PVA-containing compositions which further limits its potential use. In particular, there are currently no formulations that can be readily moulded to a minimum thickness required (less than 200 microns) to ensure product release at low aqueous temperatures, typically at or below 5° C. in less than 2 minutes. Such a film is desirable for applications such as packaging of laundry products which require release of the laundry detergent at low temperatures and on a short wash cycle.

One of the properties of the polymer that it is desirable to improve is the Melt Flow Index. This relates to the ease of flow of the melt of the polymer, defined as the mass of the polymer, in grams, flowing in ten minutes through a capillary of a specific diameter and length by a pressure applied via prescribed alternative gravimetric weights for alternative prescribed temperatures. One such method is described in the standard ISO 1133. A higher MFI is required to provide a thin walled moulding.

It is known in the art to use internal lubricants within the PVA to increase its melt flow index. For example, EP1112316 B1 (PVAXX Technologies Limited) includes a fatty acid amide in an amount up to 5% by weight. The fatty acid provides lubrication between the polymer chains thereby increasing the melt flow of the polymer. However, they are insoluble, melting and coating the polymer during processing, which may impede dissolution of the polymer. Furthermore, the amount of lubricant that can be used is limited due to excess lubricant (generally above 5% by weight of the PVA) separating out of the blend, thereby restricting their ability to improve the MFI of a polymer.

The polymer is produced by polymerisation from vinyl acetate and subsequent hydrolysis of the polyvinyl acetate (PVAc) which is formed. PVA and PVA-derived polymers are soluble in water with their solubility being determined by the molecular weight of the polymer and the degree of hydrolysis, i.e. the percentage of acetate groups of the starting polymer (PVAc) that has been replaced with OH groups. The higher the degree, the lower the solubility and the speed of solution. The differences are much more marked at low dissolving temperatures than at high ones due to the formation of crystalline zones within the polymer.

It is also known in the art that PVA requires the removal of volatiles from the composition before melt processing as without such removal processing is difficult due to the formation of steam and subsequent foaming of the polymer. Drying is generally achieved using standard drying equipment at a temperature of 90° C. for a period of 4-9 hours, depending on make, model and formulation.

Despite attempts to mould articles from PVA or PVA derived compositions, the desired solubility characteristics have not been achieved due to the lack of melt flow required to mould a thin walled article that will dissolve in an aqueous solution within a desired time frame.

It is an aim of the present invention to provide water soluble polymer compositions, particularly but not exclusively polyvinyl alcohol compositions, that address or at least alleviate the aforementioned problems experienced with the polymer compositions of the prior art.

Further aims of the present invention are to provide methods for the production and extrusion and/or moulding of water soluble polymer compositions.

BRIEF SUMMARY OF THE INVENTION

Accordingly, a first aspect of the present invention provides a melt-processable water soluble polymer composition comprising a blend of a water soluble polymer with at least 15% by weight of the total weight of the composition of a hygroscopic salt to act as a lubricant to render the polymer extrudable and/or mouldable, wherein the composition has a water content of less than 10% by weight.

Preferably, there is provided at least 20% by weight of the total weight of the composition of the hygroscopic salt. Furthermore, the water soluble polymer may be solid at ambient temperature. More preferably, the polymer comprises a polyvinyl alcohol polymer. The PVA used in the present invention is not limited to any particular degree of hydrolysis. Partially or fully hydrolysed PVA may be used in the present invention. Similarly, the PVA is not limited to a particular molecular weight. The PVA may have a relatively low molecular weight of around 20,000 up to and beyond a molecular weight of 150,000.

The PVA preferably has a maximum water content of 5% by weight. It has been surprisingly found that the hygroscopic salt not only draws water from the PVA but also acts as an internal lubricant for the PVA increasing its Melt Flow Index.

Preferably, the hygroscopic salt is an anhydrous or hydrated salt selected from an alkaline or alkaline earth metal salt. Depending upon the end use of the composition, it may be beneficial to use a salt that is approved for food and/or pharmaceutical use and/or has other properties that may impart additional benefits in the end product, such as a water softener. More preferably, the salt is selected from the group consisting of sodium chloride, sodium citrate and magnesium chloride, especially being sodium chloride or citrate.

A preferred embodiment of the first aspect of the invention comprises a blend of a water soluble polymer and an amount of sodium chloride effective to render the blend extrudable.

The salt has a water content of less than 10% by weight, preferably less than 1% by weight, more preferably less than 0.5% by weight, especially less than 0.2%. Ideally, the salt is in the anhydrous form. The salt may be micronized, for example the particles having a mean size of less than 100 microns, preferably being in the range 0.03-75 µm, especially 60-70 µm. The salt may also be coated to improve its properties, for example with sodium aluminosilicate, silicon dioxide and/or sodium hexacyanoferrate. One such example is sodium chloride salt coated with Sodium Aluminosilicate 0.5% (E554), Silicon Dioxide 0.75% (E551) and Sodium hexacyanoferrate (E535) as an anti-caking agent, available from Custom Powders (www.custompowders.co.uk).

The salt may be included in the composition in an amount up to 75% by weight of the total weight of the formulation. The salt is included in an amount of at least 15%, and preferably at least 20%, by weight of the total weight of the formulation, more preferably at least 40% by weight, and especially at least 50% by weight.

The composition may be compounded with optional additives to improve processability of the composition, such as plasticizers to enhance flexibility and/or lower the melt temperature of the polymer under extrusion or moulding, stabilizers to increase heat resistance and/or pigments to add colour. Preferably, thermal stabilizers, such as metal stearates, are included in an amount up to 0.5% by weight, preferably up to 0.3% by weight. However, the composition is preferably free from any fatty acid amides or esters.

In the first aspect of the present invention, the inbound water from other constituents within the composition surface, such as the polymer itself, treat the salt to enable it to act as an internal lubricant. An "internal" lubricant functions to improve lubrication between polymer chains. The use of a salt as a lubricant removes the need to use other types of prior art internal lubricant, such as fatty acid amides or esters.

An example composition without solvent plasticizer may be as follows:

| | |
|---|---|
| PVOH (80% hydrolyzed) | 69.7% |
| Sorbitol | 10.0% |
| NaCl | 20.0% |
| Thermal stabilizers | 0.3% |
| Total | 100% |

Melt Flow Index tested 190° C. using a 2.16 kg weight grams in 10 minutes=21.5

The sodium chloride is more readily soluble in water than the polymer, but is not a thermoplastic resin. Therefore, it would be expected that the angular crystalline structure of the salt would not mix with the polymer and would actually impede melt flow. Surprisingly, this is not found to be the case.

Preferably, the salt is provided in a higher percentage by weight than the solvent polymer plasticizer. More preferably, the ratio of salt to solvent polymer plasticizer is 1.25-12:1, especially 1.25-7:1, ideally 4-5:1.

Alternatively, the composition may include a solvent polymer plasticizer, preferably being a hygroscopic organic solvent, more preferably being selected from glycerine (also known as glycerin or glycerol) and propylene glycol.

According to a second aspect of the invention, there is provided a melt-processable water soluble polymer composition comprising a blend of a water soluble polymer with at least 15% by weight of a hygroscopic salt to act as a lubricant to render the polymer extrudable and/or mouldable.

A third aspect of the present invention provides a soluble polymer internal lubricant comprising a blend of a hygroscopic salt and solvent polymer plasticizer of the salt.

The lubricant according to the third aspect of the present invention may be blended with a water soluble polymer for processing thereof. In this respect, a fourth aspect of the present invention provides a melt-processable water soluble polymer composition comprising a blend of a water soluble polymer with an internal lubricant to render the polymer extrudable and/or mouldable, the lubricant comprising a hygroscopic salt, preferably an anhydrous or hydrated metal salt, blended with a solvent polymer plasticizer. Preferably, the lubricant is in accordance with the third aspect of the invention.

It is preferable for the salt to have minimal water content, preferably the salt having a water content of less than 10% by weight, the salt comprising at least 15% by weight of the total weight of the formulation, more preferably at least 40% by weight, especially at least 50% by weight.

The lubricant according to the invention when mixed with the water soluble polymer preferably has a Melt Flow Index of at least 20 g (10 mins/190° C./2.16 kg, under ISO 1133), more preferably at least 40 g, especially 60 g.

The compositions of the present invention may be used in foodstuffs and/or pharmaceuticals. Therefore, it is to be appreciated that, if possible, the lubricant and other constituents of the composition have been approved for food and/or pharmaceutical use.

The composition according to the first, second, third or fourth aspect of the present invention may be provided in any suitable form for further processing but preferably is provided in the form of a powder, tablet or pellets for use in extrusion and/or moulding of an extruded and/or moulded product, such as an extruded filament, containing the soluble polymer. The composition may be manufactured by any conventional method, such as by melt compounding or cold processing, which in this latter case may include calendaring, adapted calendaring, and/or compaction. Cold pressing, and more preferably adapted calendaring, may be the technique of choice.

The compositions of the present invention may further include a plasticizer to lower the melt temperature of the polymer under extrusion and/or moulding. The plasticizer may be selected from the group consisting of glycerine, ethylene glycol, triethylene glycol, low molecular weight polyethylene glycols and low molecular weight amides. A preferred plasticizer is glycerine. The plasticizer may also function as the solvent polymer plasticizer of the salt internal lubricant.

A fifth aspect of the invention provides a method of making a water soluble polymer composition comprising blending a water soluble polymer with at least 15% by weight of the total weight of the composition of a hygroscopic salt to act as a lubricant to render the polymer extrudable and/or mouldable, wherein the water content of the composition is less than 10% by weight, the method optionally including adding a solvent polymer plasticizer.

A sixth aspect of the invention provides a method of extruding and/or moulding a water soluble polymer composition comprising softening a composition according to the first, second, third and/or fourth aspects of the present invention to form a melt flow. Preferably, heat and/or pressure soften the composition to create a melt flow.

The melt flow preferably has a Melt Flow Index of at least 20 g (10 mins/190° C./2.16 kg, under ISO 1133), more preferably at least 40 g, and especially 60 g. Preferably, the polymer composition is moulded into a form having a thickness of less than 200 microns, preferably less than 100 microns thereby enabling the form to dissolve within 80 seconds at 5° C. in aqueous solution. The moulded form may be any thin walled moulding, such as a container, or a film. Extrusion is also possible, although the composition of the present invention is especially beneficial for mouldings.

DETAILED DESCRIPTION OF THE INVENTION

The melt-processable compositions of the present invention may be processed by any known thermoprocessing method, including but not limited to, injection moulding, compression moulding, rotational moulding and film extrusion. The compositions are particularly suitable for thin-walled mouldings.

The melt-processable compositions of the invention are suitable for the manufacture of any article currently made from extrudable and/or mouldable polymers, including films, containers and bottles. The compositions are suited to the manufacture of filaments and fibre, for use in spunbond, non-woven and melt-blowing applications. The composition is suitable also for manufacture of such articles as detergent and agro chemical sachets and containers, mulch films, plant pots, dome tic bags, diapers, drinking straws, fem care products, hangers, incontinence pads, sachets, six pack rings, disposable clothing, expanded foams, gloves, film canisters, golf tees, shot gun cartridges, bed pans, bottles, bowls, cotton buds, hospital curtains, "one-use" sterile products and packaging materials.

PVA generally has moisture content up to 5% by weight. This has to be reduced to below 1% to avoid processing issues on standard thermoplastic equipment, such as the generation of volatiles which causes foaming. Conventionally, the polymer is dried in a standard polymer dryer for 4-8 hours at 90° C. It has been found that the addition of a hygroscopic salt in a particular amount, preferably having a low water content or being anhydrous, removes water from the surrounding PVA. More surprisingly, the absorption of water by the salt provides a self-lubricating coating on the salt which is then able to act as an internal lubricant for the PVA. The desiccant effect of the salt reduces drying time to 2-4 hours enabling a substantial energy saving in the polymer production and furthermore, the lubrication brought about by the salt greatly increases the Melt Flow Index of composition such that the PVA may be readily extruded and/or moulded into products and, in particular to thin forms of less than 200 microns making it suitable for applications where dissolution of the film and/or moulding is required at temperatures as low as 5° C. within a short time period (under 2 minutes). The self-lubricating effect is still active at low moisture levels of less than 1%, i.e. even during the drying process. It is feasible that the temperature may be decreased further and therefore closer to 0° C., and the time may also be decreased.

The hygroscopic salt, such as sodium chloride, has been found to have an enhanced lubricating effect if polymer plasticizers are included in the composition, such as hygroscopic salt solvents including glycerine or propylene glycol. Absorption of water by the salt appears to act as a surface treatment enabling non solvent plasticizers to be used in the formulation, if desired. Anhydrous salts would not normally be considered as suitable for internal lubrication of water soluble polymers. In this respect, precipitated calcium carbonate (PCC) has been used in small amounts (2-3%). Alcohol plasticizers are not solvents of PCC so high loadings have to be used to produce high melt flow resulting in very ductile products as the PVA becomes encapsulated around the PCC particles. Melt flow indexes are also disappointing. In comparison, the present invention uses glycerine, a solvent of anhydrous sodium chloride, to partially dissolve the outer surface of the sodium chloride to provide a lubricant within the polymer chains. This produces a comparatively high MFI and increases the solubility of the polymer, whilst decreasing its ductility (a desirable trait).

It is to be appreciated that including high levels of water in the composition (either as a plasticizer or binder) even with a hygroscopic salt would not achieve the benefits of the present invention. The water would result in reversible dissolution of some or all of the salt present. Furthermore, reduction of the water content for successful processing would result in removal of the self-lubricating layer and the reformation of salt crystals of unpredictable size and shape. This hampers melt flow and would add to the drying time. Thus, it is a preference of the present invention that water is not added to the formulation beyond the low water content contained in the various constituents, such as the PVA, making up the composition.

The present invention will now be described with reference to the following non-limiting examples. The examples illustrate the high melt flow values achieved with the compositions according to the present invention, their reduced drying times and compare these properties with compositions falling outside the scope of protection.

Method of Production

PVA (polymer), sodium chloride (lubricant), glycerin (plasticizer) and thermal plasticizers were mixed in a bell tub, low-shear mixer for 3 minutes. The mix was then fed into a compounder via a screw and formed into pellets via an adapted calendaring process. The adapted calendaring process causes partial or complete melting of the PVA as a result of frictional shear as it is passed between the roller and die, causing agglomeration before extrusion through the die. The temperature of the pre-extrudate varied from 110° C. to 140° C. and the formed pellets were then placed in a tray polymer dryer for 3 hours at 90° C.

Melt Flow Analysis 5 gram samples of the formulations prepared according to the invention were tested for MFI at 190° C. using a 2.16 kg weight. Each sample was tested and compared for MFI according to ISO 1133. The test was repeated by a factor of 10 and the mean result was recorded.

The samples were moulded using a 50 tonne moulding press in automatic mode with a cycle time of 7-10 seconds using a mould with a hot runner system at 180° C. to 200° C. The screw temperature profile (in ° C.) from the hopper to tip was 160, 170, 180, 180-190. The part wall section was measured between 600-350 microns.

Example 1

Formulations were made according to the method above having the ingredients shown in Table 1 below mixed in the given percentage by weight. 88% hydrolysed PVA was used in each formulation and the thermal stabiliser was calcium stearate. The Melt Flow Index (MFI) was determined according to the analysis given above.

TABLE 1

| Formulation | PVA (% % by weight) | Glycerin (% by weight) | NaCl (% by weight) | Thermal stabilizers (% by weight) | Ratio of salt:glycerin | MFI/g 10 minutes |
|---|---|---|---|---|---|---|
| 1 | 84.7 | 10.0 | 5.0 | 0.3 | 0.5:1 | 7.0 |
| 2 | 39.7 | 8.0 | 52.0 | 0.3 | 6.5:1 | 44.0 |
| 3 | 38.7 | 10.0 | 51.0 | 0.3 | 5.1:1 | 56.0 |
| 4 | 36.7 | 12.0 | 51.0 | 0.3 | 4.25:1 | 77.0 |
| 5 | 25.7 | 14.0 | 60.0 | 0.3 | 4.28:1 | 78.0 |

Formulation 2 shown in Table 1 above was found to have a white/cream colour with the following properties:

| | |
|---|---|
| Density | 1.68 g/cm |
| Melt density | 1.52 g/cm at 200° C. (under ISO 1183). |

These results illustrate the importance of having a high ratio of salt to plasticizer in the formulation to achieve the desired high MFI but that peak MFI values are obtained in the above formulations where the salt to plasticizer ratio is 3.5-5:1, more preferably 4-4.4:1.

Example 2

Formulations were made according to the method above having the ingredients shown in Table 2 below mixed in the given percents by weight. 88% hydrolysed PVA was used in each formulation. The Melt Flow Index (MFI) was determined according to the analysis given above. The part wall section of the moulded formulations was measured from 600 microns to 100 microns.

TABLE 2

| Formulation | PVA (% by weight) | Propylene glycol (% by weight) | NaCl (% by weight) | Thermal stabilizers (% by weight) | Ratio of salt:propylene glycol | MFI/g |
|---|---|---|---|---|---|---|
| 6 | 84.7 | 10.0 | 5.0 | 0.3 | 0.5:1 | 9.0 |
| 7 | 39.7 | 8.0 | 52.0 | 0.3 | 6.5:1 | 40.0 |
| 8 | 36.7 | 10.0 | 51.0 | 0.3 | 5.1:1 | 51.0 |
| 9 | 38.7 | 12.0 | 51.0 | 0.3 | 4.25:1 | 75.0 |

Table 2 demonstrates that the type of plasticizer does not have a significant effect on the MFI achieved.

Example 3

Formulations were made according to the method above having the ingredients mixed in the percent by weights shown in Table 3 below. 98% hydrolysed PVA was used in formulation 10-13 and 80% hydrolysed PVA was used in formulations 14-16. The formulations were moulded using a Boy 50 tonne moulding process in automatic mode with a cycle time of 20 seconds using a mould with a cold runner system. The screw temperature profile (in ° C.) from the hopper to tip was 160, 170, 180, 180, 220. The part wall section was measured from 600 to 2000 microns.

TABLE 3

| Formulation | PVA (% by weight) | Glycerin (% by weight) | NaCl (% by weight) | Thermal stabilizers (% by weight) | Ratio of salt:glycerin | MFI/g |
|---|---|---|---|---|---|---|
| 10 | 89.0 | 10.0 | 0.0 | 0.3 | 0:1 | 1.9 |
| 11 | 84.5 | 9.5 | 5.0 | 0.3 | 0.52:1 | 3.48 |
| 12 | 80.1 | 9.0 | 10.0 | 0.3 | 1.1:1 | 2.75 |
| 13 | 67.2 | 7.5 | 25.0 | 0.3 | 3.33:1 | 1.91 |
| 14 | 20.0 | 15.7 | 64.0 | 0.3 | 4:1 | 73.5 |
| 15 | 15.0 | 11.7 | 73.0 | 0.3 | 6:1 | 1.9 |
| 16 | 12.0 | 9.3 | 78.4 | 0.3 | 8:1 | 0.00 |

Example 4

Formulation 17 was prepared as a blend in a similar way to Formulation 2 of Example 1 but having sodium citrate in place of sodium chloride, as follows:

| | |
|---|---|
| PVA (88% hydrolysed) | 39.0% by wt. |
| Sodium citrate | 51.0% by wt. |
| Glycerol | 9.70% by wt. |
| Calcium stearate | 0.3% by wt |

This formulation was found to have the following properties:

| | |
|---|---|
| Density | 1.67 g/cm |
| Melt density | 1.40-1.42 g/cm at 190° C. (under ISO 1183) |
| MFI | 38 g. |

Processing temperature was 190-200° C. with a residence time of up to 30 minutes. Drying time was 4 hours at 90° C. The MFI is again substantially higher with the salt included in the composition.

This formulation and that of Formulation 2 were examined for their extrudability in injection moulding machines made by Boy, Demag and Arburg. Extrusion processing was carried out using a single full flight screw with constant pitch. The barrel temperature had a profile of 160-200° C. and the screw speed varied typically between 20-150 rpm. Shut down of the apparatus was carried out by maintaining the temperature at 100° C. with screw rotation stopped. Complete shutdown was then carried out by switching off the machine.

Formulations 2 and 17 were capable of being moulded into a range of containers of various sizes and colours and were suitable for injection moulding. The use of sodium citrate as the polymer lubricant provides additional advantages if it is used for packaging laundry products as it acts as a water softener.

Example 5

A study was carried out to investigate the requirement to have a low water content in the formulations of the present invention.

Table 4 below sets out the composition of the formulations, together with their MFI and drying time.

TABLE 4

| Formulation | PVA (% by weight) | Glycerin (% by weight) | NaCl (% by weight) | Thermal Stabilizers (% by weight) | Water (% by weight) | Moisture content pre-drying | Moisture content post drying | Drying time/hr at 90° C. | MFI/g |
|---|---|---|---|---|---|---|---|---|---|
| A | 73.0 | 11.7 | 15.0 | 0.3 | 0.00 | 2.4 | 0.9 | 5.0 | 22.0 |
| B | 37.0 | 11.7 | 51.0 | 0.3 | 0.00 | 2.0 | 0.9 | 3.0 | 77.0 |
| C | 71.3 | 10.2 | 5.2 | 0.3 | 13.0 | 24 | 0.9 | 9.0 | 10.0 |
| D | 60.5 | 9.7 | 12.5 | 0.3 | 17.0 | 23 | 0.9 | 13.0 | 7.0 |

Table 4 clearly shows the importance of the amount of salt and water contained within the formulation on drying time and on MFI. The formulation has a higher percentage of salt (of at least 15%, preferably at least 20%, and more preferably at least 40%) with minimal or no water content. Formulations C and D which contained 13 and 17% water respectively were very sticky formulations that were not free-flowing making them unsuitable for compounding. Additionally, the excess drying times resulted in undesirable glycerine vapour loss.

The compositions of the present invention thus provide a melt-processable PVA containing polymer typically having a flexural modulus similar to other extrudable polymers. This enables a soluble and biodegradable polymer to be used for the processing of a wide variety of articles without the processing problems experienced in the prior art, such as thermal degradation and high temperature cross-linking. The known advantageous properties of PVA, such as its high tensile strength and good barrier characteristics, are retained in the melt-processable composition, which may be extruded on current extrusion lines, blow-moulders and injection moulders without modification.

The invention claimed is:

1. A method of making a water soluble polymer composition, the method comprising:
   blending a water soluble polymer with a hygroscopic salt to act as a lubricant to render the polymer extrudable and/or mouldable; and
   adding a solvent polymer plasticizer, the hygroscopic salt being partially dissolved in the solvent polymer plasticizer,
   wherein:
   the water content of the composition is of less than 10% by weight of the total weight of the composition;
   the hygroscopic salt is least 15% by weight of the total weight of the composition; and
   the solvent polymer plasticizer is propylene glycol.

2. The method according claim 1, wherein the water soluble polymer and the hygroscopic salt are blended in solid form without adding additional water.

3. The method according to claim 1, wherein the hygroscopic salt is provided in a higher amount by weight than the solvent polymer plasticizer.

4. The method according to claim 3, wherein the ratio of the hygroscopic salt to the solvent polymer plasticizer is in the range between 1.25:1 and 12:1.

5. The method according to claim 4, wherein the ratio of the hygroscopic salt to the solvent polymer plasticizer is in the range between 1.25:1 and 7:1.

6. The method according to claim 1, wherein the water soluble polymer comprises a polyvinyl alcohol polymer.

7. The method according to claim 1, wherein the hygroscopic salt is an anhydrous or hydrated salt selected from an alkaline or alkaline earth metal salt.

8. The method according to claim 1, wherein the hygroscopic salt has a water content of less than 10% by weight of the total weight of the composition.

9. The method according to claim 1, wherein the hygroscopic salt is included in an amount of at least 40% by weight of the total weight of the composition.

10. The method according to claim 9, wherein the hygroscopic salt is included in an amount of at least 50% by weight of the total weight of the composition.

11. The method according to claim 1, wherein the hygroscopic salt is included in an amount of up to 75% by weight of the total weight of the composition.

12. The method according to claim 1, wherein the hygroscopic salt is in the anhydrous form.

13. The method according to claim 1, further comprising the step of extruding and/or moulding the water soluble polymer composition, wherein the step of extruding and/or moulding the water soluble polymer composition comprises softening the water soluble polymer composition to form a melt flow.

14. The method according to claim 1, wherein the melt flow has a Melt Flow Index of at least 20g (10 mins/190° C/2.16kg, under ISO 1133).

15. The method according to claim 14, wherein the water soluble polymer composition is moulded to form a thin-walled article having a thickness of less than 200 microns.

16. The method as claimed in claim 1, wherein the blending is performed in a mixer to cause partial or complete melting of the water soluble polymer by a calendaring process.

17. A method of making a water-soluble polymer composition, the method comprising:
blending a water soluble polymer with at least 15% by weight of the total weight of the composition of a solid hygroscopic salt to act as a lubricant to render the polymer extrudable and/or mouldable, and with a solvent polymer plasticizer, wherein the solvent polymer plasticizer is propylene glycol; and
forming the composition into a powder, a pellet, a tablet, or an article extruded from the composition,
wherein the water content of the composition is of less than 10% by weight of the total weight of the composition.

* * * * *